(No Model.)

L. T. NEWELL.
GRIDIRON.

No. 347,822. Patented Aug. 24, 1886.

Witnesses:
Alex. Selkirk
Charles Selkirk

Inventor:
Lewis T. Newell

UNITED STATES PATENT OFFICE.

LEWIS T. NEWELL, OF ALBANY, NEW YORK.

GRIDIRON.

SPECIFICATION forming part of Letters Patent No. 347,822, dated August 24, 1886.

Application filed June 22, 1885. Serial No. 169,458. (No model.)

*To all whom it may concern:*

Be it known that I, LEWIS T. NEWELL, a citizen of the United States, residing at Albany, in the county of Albany and State of New York, have invented a new and useful Improvement in Gridirons, of which the following is a specification.

My invention is a gridiron in which parallel double-grooved bars in conjunction with a gutter are employed; and the objects of my improvement are, first, to support the meat so as to expose the whole of its lower surface to the heat; second, to prevent the juices exuded from the meat dropping onto the fire or stove. I attain these objects by the gridiron illustrated in the accompanying drawings, in which—

Figure 1:
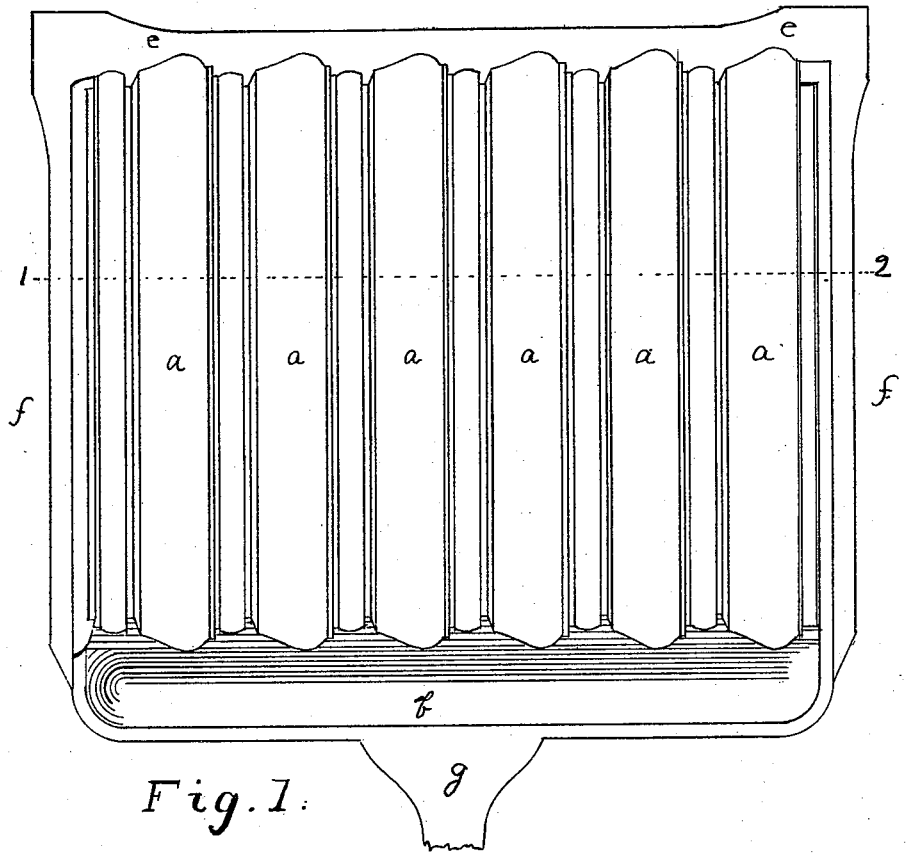
Figure 2:
Figure 3:
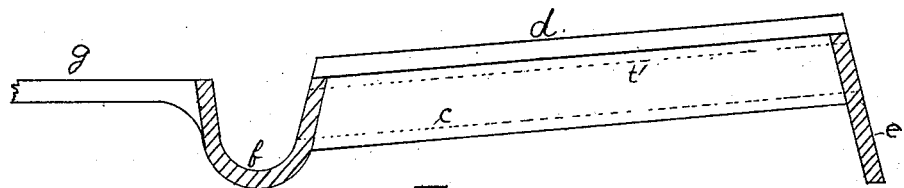

Figure 1 is a top view of gridiron; Fig. 2, a vertical section of gridiron on the dotted line 1 2, Fig. 1. Fig. 3 is a vertical section made lengthwise of the bars.

Similar letters refer to similar parts throughout the several views.

The gutter $b$ and the plates $e$ and $ff$ constitute the frame of the gridiron.

$a\ a$ are the parallel bars joined at their lower ends to the gutter $b$, their upper ends connected and covered by the plate $e$. The grooves $c\ c$ on the lower edges and grooves $t\ t$ on the upper edges of the bars $a\ a$ collect and convey the juices to the gutter $b$. On the ribs $d\ d$ the meat is placed and supported above the grooves $c\ c\ t\ t$ and the inclined upper surface of the bars $a\ a$.

The vertical openings or slots $o\ o$ admit the heat to the under surface of the meat, but, being vertical or nearly to a perpendicular line, do not permit the juices dropping from the meat to pass through them onto the fire or stove.

The location of the handle is shown by the letter $g$.

Fig. 2 shows the form of the bars $a\ a$. They are inclined transversely, having a groove on each edge, with a rib located between the grooves $c$ and $t$, the said rib projecting upward high enough to carry the meat clear of the grooves and the inclined surface of the bars. Fig. 2 also shows the form of the lower surface of the bars and their arrangement, the lower edge of a bar being placed on or nearly to a vertical line with the upper edge of the bar next to it, the intention being to so locate the bars that they will catch the juices dripping from the meat when it is placed on the ribs $d\ d$.

Fig. 3 shows the inclination of the bars lengthwise, the inclination causing the juices to run from the grooves $c$ and $t$ into the gutter $b$. The grooves $c$ and $t$ are shown by the dotted lines in Fig. 3.

I am aware that prior to my invention gridirons have been made with grooved bars and horizontal openings; also made with grooved bars inclined transversely and having vertical openings; also made with double-grooved bars, both grooves made in the same plane, with meat-supporting rib between the grooves in conjunction with single-grooved bars, and having horizontal openings or slots between the single-grooved bars and the double-grooved bars. These old forms of construction and arrangement of bars in gridirons I do not claim.

In none of the gridirons made prior to my invention were the bars made inclined transversely with grooves each side of a meat-supporting rib, each groove in a different plane, in conjunction with vertical openings or slots for the passage of heat to the top of the gridiron.

What I claim, and desire to secure by Letters Patent of the United States, is—

1. In a gridiron, a series of bars, $a\ a$, made inclined transversely, having grooves $c\ c$ on their lower edges, grooves $t\ t$ on their upper edges, and vertical ribs $d\ d$ between the grooves $c\ c$ and $t\ t$, substantially as described.

2. The combination of the main body of the gridiron, having the receiving-gutter $b$, with bars $a\ a$, made inclined transversely, having grooves $c\ c$ on their lower edges, grooves $t\ t$ on their upper edges, and vertical ribs $d\ d$ between the grooves $c\ c$ and $t\ t$, the said bars being parallel with each other, and having the lower edge of one nearly in the same vertical plane with the next bar, with a space between, substantially as described.

LEWIS T. NEWELL.

Witnesses:
ALEX. SELKIRK,
WM. F. SCHLINGLOFF.